United States Patent [19]

Murata et al.

[11] 4,153,759
[45] * May 8, 1979

[54] STORAGE BATTERY, SEPARATOR THEREFOR AND METHOD OF FORMATION

[75] Inventors: Kazuo Murata; Shiro Tanso; Junzo Yamao, all of Takatsuki, Japan

[73] Assignee: Yuasa Battery Company Limited, Takatsuki, Japan

[*] Notice: The portion of the term of this patent subsequent to Feb. 7, 1995, has been disclaimed.

[21] Appl. No.: 875,641

[22] Filed: Feb. 6, 1978

Related U.S. Application Data

[63] Continuation of Ser. No. 763,038, Jan. 27, 1977, Pat. No. 4,072,802, which is a continuation-in-part of Ser. No. 592,344, Jul. 1, 1975.

[30] Foreign Application Priority Data

Jul. 11, 1974 [JP] Japan ................................. 49-79916

[51] Int. Cl.² ............................................. H01M 2/18
[52] U.S. Cl. .................................................... 429/147
[58] Field of Search .................. 429/146, 147, 254, 81

[56] References Cited

U.S. PATENT DOCUMENTS 4,072,802  2/1978  Murata et al. ....................... 429/147

*Primary Examiner*—Donald L. Walton
*Attorney, Agent, or Firm*—Watson, Cole, Grindle & Watson

[57] ABSTRACT

The present invention relates to a high performance lead-acid storage battery having a special microporous separator between a positive and a negative plate in a cell of the battery. The separator is comprised of a microporous embossed thin sheet having many small projecting embossed parts which provides unique characteristics in a cell including low electric internal resistance in the cell, sufficient electrolyte between the plates in the cell and sufficient elasticity of the separator to prevent active material shedding, thereby giving a high performance at a high rate of discharge and long life.

9 Claims, 12 Drawing Figures

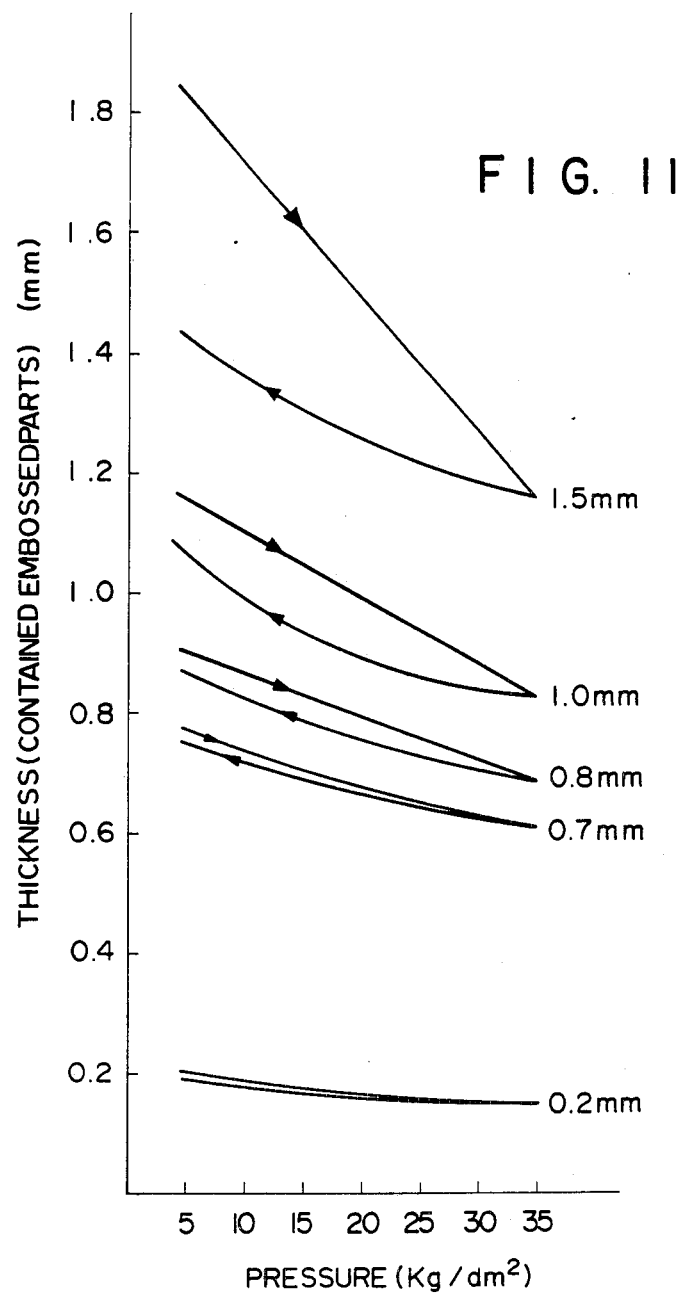

STORAGE BATTERY, SEPARATOR THEREFOR AND METHOD OF FORMATION

This is a continuation of application Ser. No. 763,038 filed Jan. 27, 1977 now U.S. Pat. No. 4,072,802, which is a continuation-in-part of our copending application Ser. No. 592,344 filed July 1, 1975.

This invention relates generally to storage batteries and more particularly to a novel improved lead-acid storage battery.

Separates of a thickness of 0.7 to 1.0 mm have been conventionally used for lead-acid storage batteries, but, in order to meet the increasing requirements of higher performance separators and lighter weight, microporous membrane separators of thicknesses of less than 0.5 mm have been recently suggested.

However, there have been defects that, even in those cases where microporous membrane separators are used, spacers such as glass mats had to have been used together with the separators in order to have enough electrolyte maintained between the negative and positive plates to prevent active material shedding in positive plates and to prevent active material expansion in negative plates. Therefore, such a storage battery has been high in cost.

The present invention is a means to overcome all of the above-mentioned defects.

A first object of the present invention is to provide a storage battery of a high performance and long life.

A second object of the present invention is to provide a storage battery which is easy to make and low in cost.

The present invention can be easily understood by referring to the following drawing and more detailed description.

FIG. 4B is a more elongated view of a embossed separator of the present invention.

FIG. 11 is a graph of elasticity curves in pressure tests of different thickness separators.

Figure 1:
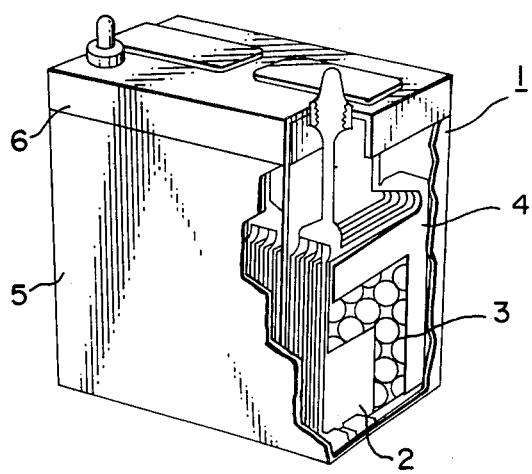
FIG. 1 is a partially cut away perspective view of a storage battery according to the present invention.

In the drawing, the reference numeral 1 refers to a storage battery of the present invention, the reference numerals 2, 3 and 4 represent a negative plate, a microporous membrane separator and a positive plate respectively. These parts are contained in a container 5 which is fitted with a lid 6 at the top as shown in FIG. 1. The storage battery is assembled in the well known manner.

One of the important features of the present invention is the application of embossed special microporous membrane separators to a storage battery. Such a special microporous embossed separator is comprised of a microporous embossed thin sheet having many small projecting embossed parts which provides unique characteristics in a cell including low electric internal resistance in a cell, sufficient electrolyte between the plates in a cell and sufficient elasticity of the separator to prevent active material shedding, thereby giving a high performance at a high rate of discharge and long life.

One of the recent developments in automotive battery technology has been the improvement in high rate discharge characteristics and the development of thin separators to obtain lower internal resistance between the plates in a cell. But there are some problems with thin separators such as how to provide sufficient electrolyte between positive and negative plate in a cell and how to prevent shedding of positive active material and prevent expansion of negative active material.

Figure 9:
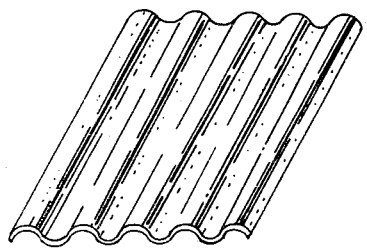
FIGS. 7, 8 and 9 are perspective views of conventional separators.
Figure 6:
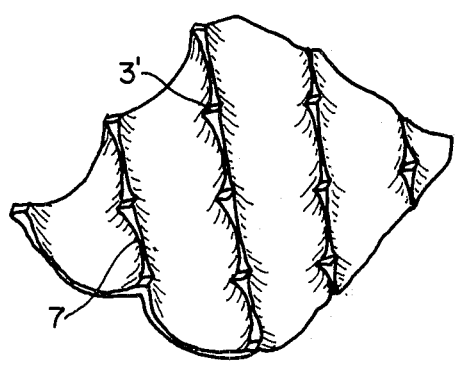
FIG. 6 shows a perspective view of another embodiment of the present invention.
Figure 7:
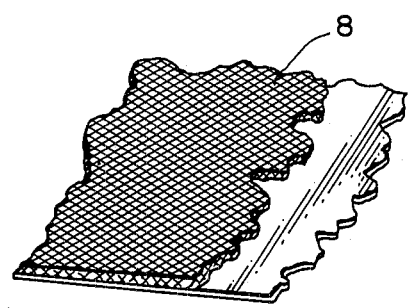
Figure 8:
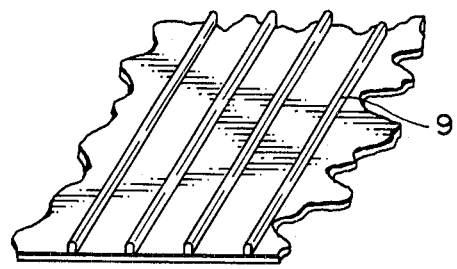

Conventional separators have been provided with spacers such as glass mat, armour rib and at times corrugating embossing as is shown in FIGS. 7, 8 and 9. FIG. 7 shows the separator with glass mat 8. FIG. 8 shows the separator with armour rib 9. FIG. 9 shows a corrugated separator. Providing a glass mat with a thin separator gives excellent characteristics for the battery as sufficient electrolyte is able to be between the plates and positive active shedding and expansion of negative active material is prevented by the elasticity of glass mat.

Providing a thin separator with armour rib is not as beneficial for battery characteristics because of the flexibility of the thin armour rib separtor. Flexibility in the armour rib type separator allows a large volume for expansion of negative active material and for the gas evolved from the plates to be trapped between the separator and plate. A further defect of armour rib type separators is that the armour rib can not sufficiently prevent shedding of active material.

Corrugated type separators have an excellent advantage in that they have no additional material for the spacer such as glass mat or armour ribs. However, they have defects when used on thin sheets due to the flexibility of thin sheets and therefore do not have the ability of preventing both active material shedding and negative material expansion. Moreover, corrugated type separators cannot be wound in a roll in the direction of the grooves formed by the corrugations even with its flexible nature because of the linearity of the embossed grooves.

The present invention overcomes all the above defects and gives ideal characteristics for the thin separators. These separators give excellent performance in an automotive battery such as improved cranking power and long life. The special separator of this invention has many of the features set forth below.

(1) The thickness of the separator sheet is less than 0.5 mm to give excellent low electric resistance and flexibility.

(2) The separator sheet has submicron pore size to prevent traversal of active material through the pores in this sheet. Preferably, the pore size of the sheet averages between 0.05 and 0.5 microns.

(3) The separator sheet is mainly made of plastic resinous material such as synthetic resin to give flexibility and a heat meltable characteristic during embossing.

(4) The separator sheet is embossed to have many small projected parts or projections, each projection being less than 1 cm$^2$ in projection area and less than 1.5 mm in height. The separator sheet may have more than 100 projections per 100 cm² to give a sufficiently strong elasticity to prevent shedding of active material and expansion of negative active material.

(5) The separator sheet has embossed channels in connection with each other between the embossed projections so to prevent gas from being trapped between the separator and the plate.

(6) The embossed projected parts are partly melted to make the micropores of resinous material become filmy or smaller in pore size, thereby making the separator sheet mechanically strong and resistant to oxidation when the embossed projections of the separator are in contact with a positive plate in a cell.

(7) The embossed microporous sheet may be integrated with a macroporous sheet or base material such as a non-woven fabric to obtain better mechanical elasticity for the resultant separator.

(8) Preferably the melting point of the microporous resinous sheet is lower than the macroporous sheet so as to make best mechanical condition in the embossed parts by becoming like fiber reinforced film.

Figure 2:
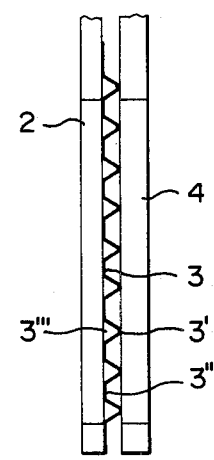
FIG. 2 is a magnified, vertically sectioned side view of a portion of the storage battery shown in FIG. 1 comprising of a combination of a negative plate, a microporous membrane separator according to the present invention and a positive plate.
Figure 3:
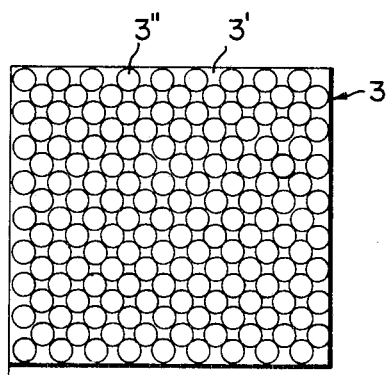
FIG. 3 is a similarly magnified plan view of the microporous membrane separator of FIG. 2.
Figure 4A:
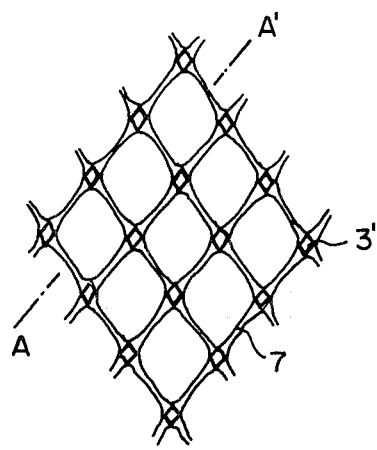
FIG. 4A and 4B are magnified views of the embossed separators having projecting embossed areas of other embodiment of the present invention. Especially
Figure 4B:
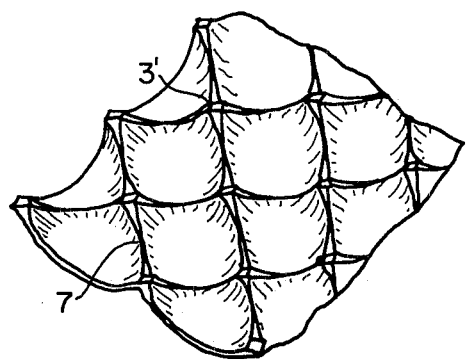
Figure 5:
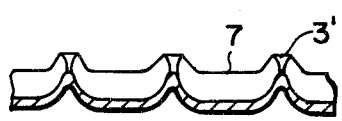
FIG. 5 is a further magnified sectioned view on line A—A' in FIG. 4A.

Such a special microporous membrane separator may be made by first forming a microporous membrane sheet by drying a uniform solution having as its main component a synthetic resin on a macroporous base sheet of a synthetic resin. The solution also includes a solvent for the synthetic resin and preferably a third component which is not a solvent for the synthetic resin. The sheet is then embossed with heated rollers or dies. The heat causes the micropores in the embossed parts to at least partially close and the embossed parts to become filmy. Such an embossed part or area 3' is shown in FIGS. 2 and 3. The remainder of the separator sheet remains microporous. Rendering the embossed parts filmy causes the mechanical and chemical strengths and modulus of elasticity of the separator to be increased. For example, because of the elasticity of the embossed parts or area 3', a proper spacing can be established and maintained between the negative and positive plates. A proper amount of electrolyte can be held in the interior 3''' of the embossed part. As a result, a storage battery having favorable performance can be obtained.

Another important feature of the present invention is to have the positive plate of the lead-acid storage battery in direct contact with the embossed filmy parts which are formed on the microporous membrane separator. This is clearly shown in FIG. 2 where the microporous membrane separator 3 is arranged between the negative plate 2 and positive plate 4. The positive plate 4 is in direct contact with the embossed parts 3' of the microporous membrane separator 3. This has the advantage that a storage battery which is capable of a long useful life is obtained by preventing the oxidation and corrosion of the separator on the positive plate.

The form of the embossed parts can be of a variety of shapes. It advantageous and preferable that the filmy embossed parts constitute from 5 to 40% of the whole. Otherwise, in the event that the embossed areas make up more than 40%, the electric resistance of the battery is remarkably increased. On the other hand, when the embossed areas constitute less than 5%, the mechanical strength of the embossed part is markedly reduced and there is a danger of short-circuiting. The projection height should be less than 1.5 mm to obtain a stable projection of the embossed projected part which therefore tends not to collapse and also to maintain good elasticity. The projecting part should also be less than 1 cm² in area to maintain strong mechanical elasticity. Larger projecting areas give smaller elasticity per unit area. Higher numbers of embossed projections per unit area of sheet give higher mechanical elasticity and over 50 dots or projections per 100 cm² gives good elasticity in comparision with glass mat.

Furthermore, the electric resistance of such a microporous membrane separator is very low, as low as $0.0005\Omega/dm^2$/sheet at a temperature of 25° C. in a dilute sulfuric acid of a specific gravity of 1.200. When a storage battery structured so that the positive plate is in direct contact with the embossed parts of the separator was tested, the low temperature discharge at $-15°$ C. of 150 amperes was 20% higher than a comparable battery in which the conventional corrugated embossed parts were not fused and the useful life was about twice as long. The roll temperature may be different depending upon the resin to be used; however, it is preferably between the resin softening temperature and a temperature 30° C. above the softening temperature.

The synthetic resin used in the microporous sheet of the present invention may be selected from a variety of materials. Acceptable synthetic resins include polyvinyl chloride, polystyrene, heat resistant ABS resin, polysulfone, polyvinylidene fluoride, polypropylene or vinyl chloride-vinylidene chloride copolymer. Furthermore, the synthetic resin, solvent and non-solvent combination can be properly chosen. The micropore diameter can be made as desired depending on the above-mentioned combination of material and solvent and drying conditions.

The macroporous base material to be used in the present invention is a synthetic fiber fabric, such as either a knit, woven fabric net, non-woven fabric or a glass mat of a thickness of less than 0.5 mm. Another feature of the present invention is the use of such a macroporous base material for the separator. The filmy synthetic resin becomes integral with and a reinforcement for the macroporous base material. It thereby increases the rigidity of the separator and serves to accurately keep the proper clearance between the positive plate and negative plate in the storage battery. If the macroporous base is eliminated, the embossed parts are very weak against the pressure from the battery plates. The fact that the macroporous base is not melted by the heat during embossing is important for improving the embossability and strengthening of the filmy parts.

The embossed part to be formed on the microporous membrane separator may be, for example, in the form of a diamond or a dot. The form is preferably such that gases which are produced in the battery during use may easily escape. For example, a rhombic form, or an elliptic form, particularly an elliptic form having the long axis in the vertical direction is better than the diamond or dot. In every projection pattern, the channel projection should be lower in height than the projection part or dot and should be between each projection dot in connection with each other so to help the gas from the plate to go up easily between separator and plate surface without being trapped. The channel direction should preferably be designed to allow the gas to go upward easily in a cell.

The area of the filmy embossed parts is determined by taking the rigidity of the separator and the depression of the embossed parts and number of projection dots by the plate fastening pressure into consideration and can be freely adjusted with the nipping pressure and temperature during embossing of the separator. It is not always necessary to make all of the surface of the embossed part filmy. In some cases, it is effective to only make the micropores in the embossed part smaller than in other parts of the separator even though they are not totally clogged. The embossed parts may be made filmy not only by heating with the embossing roll but also by making the embossed parts with the embossing roll in advance and then heating the embossed parts. As required, the concave cavities formed on the back of the above-mentioned embossed parts of the microporous separator sheet may be filled with a synthetic resin so that the embossed parts of the separator may better endure the pressure between the plates and not tend to collapse.

In applying the microporous membrane separators to storage batteries in the present invention, there are many types of batteries wherein the separators are made in the form of a bag and plates are inserted into the bag. In others, a stacking method is employed wherein the separators are inserted one by one between the negative and positive plates. A long length of the embossed separator in accordance with the present invention can be wound in a roll and can therefore be supplied to battery assembly machine in a continuous manner to give a lower production cost.

In order to have the above-mentioned features of the present invention better understood, they shall be further explained in the following examples:

EXAMPLE 1

Figure 10:
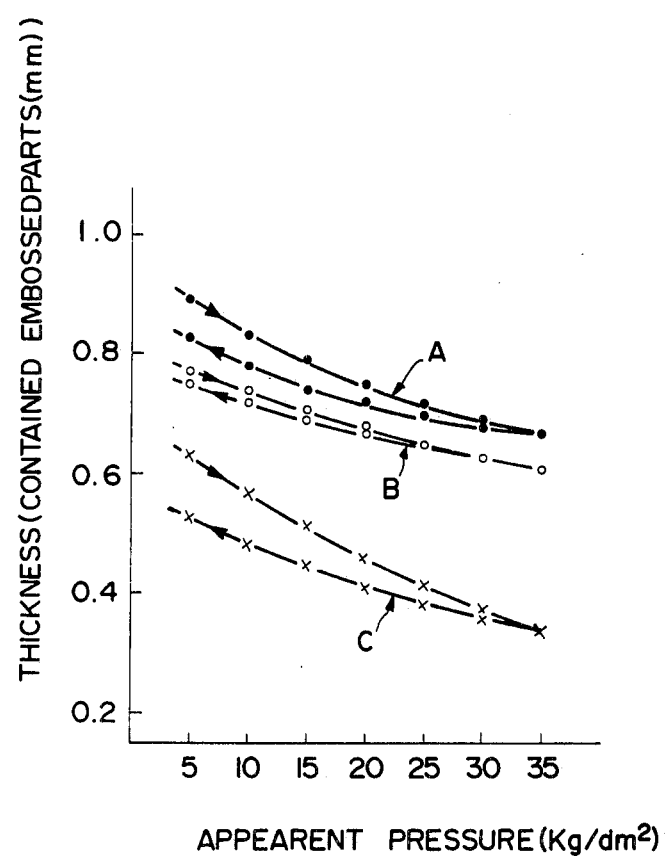
FIG. 10 is a graph of elasticity curves in pressure tests.

14 parts of polyvinyl chloride were dissolved in 56 parts of a tetrahydrofuran solvent. Then 30 parts of a non-solvent, isopropyl alcohol, were added to the solution to prepare a uniform synthetic resin solution. A macroporous base material such as a polyester non-woven fabric of a thickness of 0.1 mm was impregnated with this solution and dried to produce a membrane sheet having $10^6$ to $10^8$ micropores of an average pore size of 0.4 micron per square cm of membrane sheet. This microporous membrane sheet was passed over a first roller having a surface temperature of 130° C. and having dot type projections of a height of 2 mm and a channel of 1.7 mm connecting the projections of each dot projection, and against an opposed rubber roller under a nipping pressure of 45kg/cm². A microporous membrane separator is obtained having embossed parts or areas of a height of 0.5 mm and those areas have been made filmy by having the pores generally closed and 0.2 mm embossed channels between them. These filmy parts of the separator membrane sheet constitute about 25% of the entire membrane sheet area. One dot projection area of the filmy portion is 2 mm×2 mm and the number of dots is 225 dots per 100 cm² and the embossed sheet gives almost the same elasticity as glass mat. FIG. 10 shows elasticity comparison of the above separator with glass mat. (A) indicates the elasticity curve of a glass mat. (B) indicates the elasticity curve of an embossed separator obtained by Example 1 and (C) indicates the elasticity curve of a corrugated separator obtained from a sheet material the same as Example 1. The tests are carried out by measuring the thickness of each separator being pressed by various weights. Pressure increases at each five kg/cm² along arrow of each sheet and decreases at each five kg/cm² along arrow after arrival of 35 kg/cm². According to this figure, it is evident that the embossed separator of the present invention has excellent elasticity, about the same as a glass mat. FIG. 11 is a graph of elasticity curves in a pressure test of separators having different thickness. The test was a measure of the thickness (contained embossed parts) of a separator of the present invention at various pressures against each thickness of a separator as in FIG. 10. As is indicated, it is desirable to have the height of the embossed parts less than 1.5 mm.

EXAMPLE 2

A solution is prepared consisting of 2 parts of polyvinyl chloride, 30 parts of silicon oxide and 50 parts of tetrahydrofuran, and preparing a polypropylene non-woven fabric having a weight of 60 g/m² and web thickness of 0.2 mm, impregnating the fabric with the solution and drying it so as to obtain a sheet. This sheet is then passed between a roll having diamond-shaped embossing projections of a height 0.8 mm and a rubber roll under the conditions of a nipping pressure of 3 kg/cm² and of a temperature 130° C. to obtain a separator having embossed filmy parts of a height of 0.60 mm. As this embossed separator contained inorganic substances, the contraction of the resin during heating to form the embossed parts could be prevented and the dimensional precision was high. Although the filmy area formed by the embossing was only 15%, the degree of distortion at a temperature of 80° C. under a fastening pressure between the plates of 200g/cm² was less then 0.5% and the mechanical strength of the separator was high.

The electric resistance of the separator according to the present invention at 25° C. in sulfuric acid of a specific gravity of 1.240 was 0.0004Ω/dm²/sheet before the embossing and 0.0005Ω/dm²/sheet after the embossing.

When the life of a storage battery containing these separators was tested in the manner set forth previously, it was 305 cycles.

EXAMPLE 3

A polypropylene non-woven fabric of weight of 50g/m² and a web thickness of 0.15 mm was painted on one surface with a resin solution consisting of 20 parts of polyvinylidene fluoride and 80 parts of solvent dimethylformamide. The painting thickness was adjusted to be 0.5 mm and then the fabric was dipped in a water bath to remove solvent and was dried. The separator obtained consisted of two layers, a macroporous base material of polypropylene non-woven fabric of an average pore diameter of several tens of microns and a microporous sheet of polyvinylidene fluoride of an average pore diameter of 0.05 micron. The separator thickness was 0.12 mm. When this separator was embossed in the same manner as in Example 2, the microporous sheet of polyvinylidene fluoride and the macroporous base material of polypropylene non-woven fabric were pressed and fused integrally together in the embossed parts and the mechanical strength increased by 25%.

The electric resistance of this separator was 0.0005Ω/dm²/ sheet before the embossing and 0.0006Ω/dm²/sheet after the embossing.

When the life of a storage battery containing these separators was tested in the same manner as in Example 1, it was 320 cycles.

EXAMPLE 4

A composition consisting of 20 parts of polypropylene resin powder, 30 parts of silicon oxide of a particle size of less than 0.1 micron and 70 parts of a polyethylene glycol plasticizer was uniformly mixed in a ball mill.

The composition was then placed into an extruder and molded in the form of a sheet at an extruding rate of 30g/m² under an extruding pressure of 35kg/cm² onto a polypropylene non-woven fabric having a web thickness of 0.1 mm and a weight of 40g/m² to form a laminate. The laminate was cooled and was then dipped in water to extract the polyethylene glycol. The thus obtained separator was of a thickness of 0.12 mm, had an average pore diameter of 0.3 micron, its electric resistance in sulfuric acid of a specific gravity of 1.200 was 0.0006Ω/dm²/sheet. When this separator was embossed in the same manner as in Example 2, the electric resistance was 0.00075Ω/dm²/sheet.

When the life of a storage battery containing these separators was tested in the same manner as in Example 1, it was 293 cycles.

A separator sheet was obtained by extruding and molding the same resin composition in a sheet thickness of 0.12 mm without using the polypropylene non-woven fabric in this example. After extracting the plasticizer, the resin sheet was embossed in the same manner as in Example 2. The sheet was cracked at the projecting parts of the roll, was weak elastically and could not be easily used as a separator. Therefore, by using the polyproylene non-woven fabric as mentioned above, an elasticity was obtained and the embossing became easy.

As described above, the storage battery of the present invention is formed with special separators which have no pinholes, are highly porous, are thin, maintain a minimum distance between adjacent battery plates through the employment of embossed parts and secure an effective quantity of electrolyte between the plates. As a result, the high rate discharge characteristic of the lead-acid storage battery is very favorable. Further, the embossed parts are poreless or, even if they are somewhat porous, the pores in the embossed areas are micropores which are smaller than the micropores in the other non-embossed portions of the separator. Thus, the embossed projecting parts become filmy and are kept in direct contact with the positive plate. As a result, the separators are effective in preventing oxidation and corrosion, from being caused by the positive plate from negative plate expansion and are, therefore, capable of a long life. Further, since glass mats used to hold the electrolyte in the past have now become generally necessary, there are the additional advantages that the storage battery is comparatively low in cost and is easy to make.

Various modifications in structure and alternation of the producing process are possible without deviating from the spirit of the present invention.

For example, the embossed parts may be provided not only on one surface but also on both surfaces of the microporous membrane separator. There are advantages that, in such case, the diffusion of the electrolyte will become better and the performance will improve.

We claim:

1. A lead-acid storage battery comprising a container, at least one set of battery plates, one plate of the set being a positive plate and another being a negative plate, and a separator interposed between the positive and negative plates, the microporous separator comprising a microporous sheet of heat meltable synthetic resin containing film of less than 0.5 mm in thickness and having submicron micropores, said microporous sheet having a plurality of independent limited embossed parts projecting outwardly from the separator, each of said projecting embossed parts being substantially less than 1 cm² in area and the height of the embossed parts being less than 1.5 mm, the number of embossed parts on the sheet being more than 50 per square 100 cm² of sheet, the projecting embossed parts being connected substantially with projecting embossed channels which help gas formed in the cell escape upward out of the cell, the height of the projecting embossed channels being lower than the height of said projecting embossed parts, and the pores of said embossed parts being at least partially closed.

2. A lead-acid storage battery according to claim 1, wherein the separator includes a macroporous base material at least partially integrated with the microporous sheet, the macroporous base material made of non-woven fabric and having pores of at least ten microns in size.

3. A lead-acid storage battery according to claim 2, wherein the macroporous base material is formed of a synthetic resin material having a higher softening point temperature than that of the synthetic resin of the microporous sheet.

4. A lead-acid storage battery according to claim 1, wherein the shape of the area of an individual embossed projecting part is selected from the group consisting of dot, diamond, rhombic and elliptical.

5. A lead-acid storage battery according to claim 4, wherein a major axis of the shape of the area of the embossed parts are oriented vertically.

6. A lead-acid storage battery according to claim 1, wherein the microporous sheet also contains inorganic material.

7. A lead-acid storage battery according to claim 1, wherein the synthetic resin of the microporous sheet is selected from a group consisting of at least one of polyvinyl chloride, polystyrene, heat-resistant ABS, polysulfone, polyvinylidene fluoride, polypropylene and vinyl chloride-vinylidene chloride copolymer.

8. A lead-acid storage battery according to claim 1, wherein the surface area of the embossed areas is in a range of 5 to 40% of the overall surface area of the microporous separator.

9. A lead-acid storage battery according to claim 1, wherein concave parts formed by the embossed projecting parts are filled with a synthetic resin.

* * * * *